(12) United States Patent
Harris

(10) Patent No.: US 7,246,996 B2
(45) Date of Patent: Jul. 24, 2007

(54) METHODS AND APPARATUS FOR MAINTAINING ROTOR ASSEMBLY TIP CLEARANCES

(75) Inventor: Daniel John Harris, West Chester, OH (US)

(73) Assignee: General Electric Company, Schenectady, NY (US)

( * ) Notice: Subject to any disclaimer, the term of this patent is extended or adjusted under 35 U.S.C. 154(b) by 220 days.

(21) Appl. No.: 11/028,815

(22) Filed: Jan. 4, 2005

(65) Prior Publication Data

US 2006/0147303 A1 Jul. 6, 2006

(51) Int. Cl.
*F04D 29/58* (2006.01)

(52) U.S. Cl. .......................... 415/177; 415/1
(58) Field of Classification Search ............... 415/1, 415/9, 208, 173.6, 174.4, 177, 196, 197, 415/200, 108
See application file for complete search history.

(56) References Cited

U.S. PATENT DOCUMENTS 5,127,795 A 7/1992 Plemmons et al.
5,645,399 A 7/1997 Angus
5,899,660 A 5/1999 Dodd

*Primary Examiner*—Edward K. Look
*Assistant Examiner*—Dwayne J White
(74) *Attorney, Agent, or Firm*—William Scott Andes; Armstrong Teasdale LLP

(57) ABSTRACT

A method for assembling a rotor assembly for a gas turbine engine is provided. The engine includes an engine casing, a plurality of rotor blades, and at least one turbine shroud assembly. The method includes mounting a plurality of case segments together circumferentially to form the casing around the plurality of rotor blades and the at least one turbine shroud assembly, wherein each of the case segments includes at least two mounting flanges and a channel defined therebetween. The method also includes applying a thermal barrier coating to an inner surface of the channel and at least a portion of each mounting flange to facilitate maintaining axisymmetric running tip clearances between the plurality of rotor blades and the least one turbine shroud assembly during a cruise operation. The thermal barrier coating also facilitates controlling axisymmetric running tip clearances during a take-off operation such that an exhaust gas temperature and a specific fuel consumption is reduced.

18 Claims, 3 Drawing Sheets

METHODS AND APPARATUS FOR MAINTAINING ROTOR ASSEMBLY TIP CLEARANCES

BACKGROUND OF THE INVENTION

This invention relates generally to gas turbine engines, and more specifically to turbine casings used with gas turbine engines.

At least some known gas turbine engines generally include, in serial flow arrangement, a high pressure compressor for compressing air flowing through the engine, a combustor in which fuel is mixed with the compressed air and ignited to form a high energy gas stream, and a high pressure turbine (HPT). The high pressure compressor, combustor, and high pressure turbine are sometimes collectively referred to as the core engine. Such gas turbine engines also may include a low pressure compressor, or booster, for supplying compressed air to the high pressure compressor.

At least some known turbines include a rotor assembly including a plurality of rows of rotor blades. Each rotor blade extends radially outward from a blade platform to a tip. A plurality of shrouds couple together to form a flow path casing that extends substantially circumferentially around the rotor assembly, such that a tip clearance is defined between each respective rotor blade tip and the HPT casing. Ideally, the tip clearance is designed to be a minimum, while still being sized large enough to facilitate rub-free engine operation through a range of available engine operating conditions.

During operation, turbine performance may be influenced by the running tip clearance between turbine blade tips and the HPT casing. Specifically, as the clearance increases, leakage across the rotor blade tips may adversely limit the performance of the turbine assembly. Maintaining tight running clearances during steady state take-off operation facilitates reducing exhaust gas temperatures (EGT) overshoot. Moreover, maintaining such clearances during cruise operations facilitates reducing specific fuel consumption (SFC).

Accordingly, to facilitate maintaining blade tip clearance at least some known HPT casing designs attempt to substantially match the rate of thermal expansion of the stator case to the rate of thermal expansion of the turbine rotor assembly by controlling the casing temperature. In some instances, thermal matching of the HPT casing may be achieved via a combination of passive elements (casing thickness and thermal mass) and active elements (for example, directing cool air onto the external surface of the casing). Limiting the thermal response of the HPT casing facilitates reducing EGT overshoot and SFC.

BRIEF DESCRIPTION OF THE INVENTION

In one aspect, a method for assembling a rotor assembly for a gas turbine engine is provided. The rotor assembly includes a plurality of rotor blades and at least one turbine shroud assembly. The method includes mounting a plurality of case segments together to form a casing around the plurality of rotor blades and the at least one turbine shroud assembly. Each of the case segments includes at least two mounting flanges and a channel extending therebetween. The method also includes applying a thermal barrier coating to an inner surface of the channel and at least a portion of each mounting flange to facilitate maintaining axisymmetric running tip clearance defined between the plurality of rotor blades and the least one turbine shroud assembly during engine operations such that an exhaust gas temperature overshoot and a specific fuel consumption is reduced.

In another aspect, a rotor assembly for a gas turbine engine is provided. The rotor assembly includes at least one case segment that includes an intermediate flange, an aft flange, and a body extending therebetween. The body includes at least one channel defined therein. The rotor assembly also includes a plurality of rotor blades, at least one turbine shroud assembly coupled radially outward of the plurality of rotor blades such that an axisymmetric running tip clearance is defined between the plurality of rotor blades and the at least one turbine shroud assembly. A thermal barrier coating applied to said at least one channel, said coating is configured to facilitate maintaining the axisymmetric running tip clearance during engine operations such that an exhaust gas temperature overshoot and a specific fuel consumption is reduced.

In another aspect, a gas turbine engine is provided. The engine includes a rotor assembly including at least one case segment including an intermediate flange, an aft flange, and a body extending therebetween. The body includes at least one channel defined therein. The rotor assembly also includes a plurality of rotor blades, and at least one turbine shroud assembly coupled radially outward of the plurality of rotor blades such that an axisymmetric running tip clearance is defined between the plurality of rotor blades and the at least one turbine shroud assembly. A thermal barrier coating is applied to the at least one channel, the coating is configured to facilitate maintaining the axisymmetric running tip clearance during engine take-off and cruise operations.

DETAILED DESCRIPTION OF THE INVENTION

Figure 1:
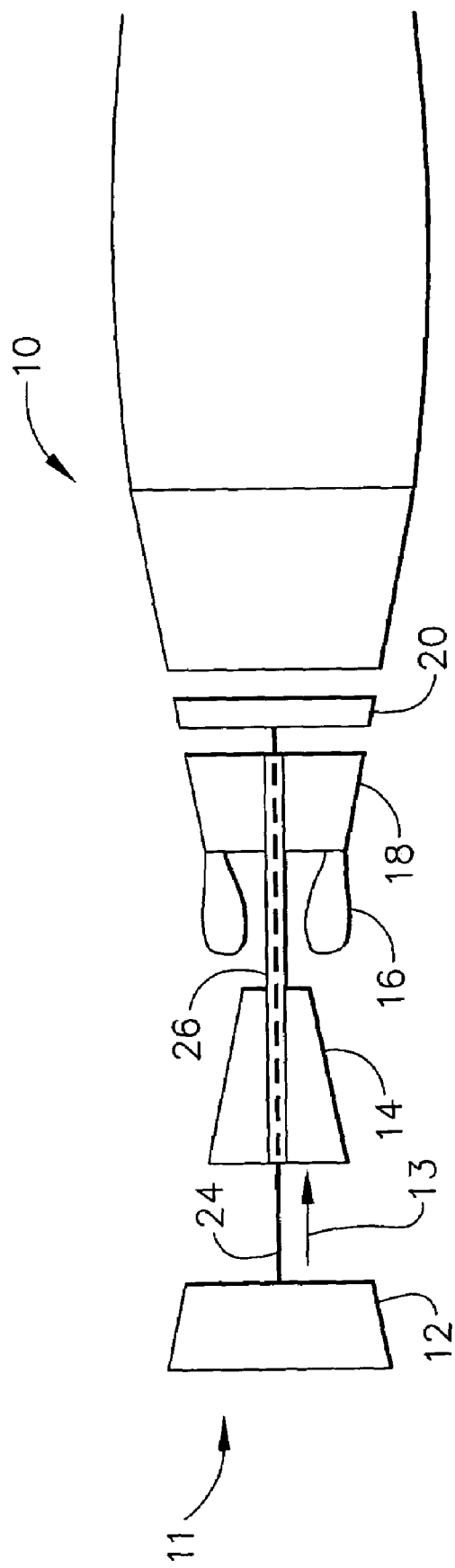
FIG. 1 is a schematic illustration of a gas turbine engine.

FIG. 1 is a schematic illustration of a gas turbine engine 10 including a low pressure compressor 12, a high pressure compressor 14, and a combustor assembly 16. Engine 10 also includes a high pressure turbine (HPT) 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, engine 10 is a GE90 engine commercially available from General Electric Company, Cincinnati, Ohio.

In operation, air flows through low pressure compressor 12 from an upstream side 11 of engine 10 and compressed air 13 is supplied from low pressure compressor 12 to high pressure compressor 14. Compressed air 13 is then delivered to combustor assembly 16 where it is mixed with fuel and ignited. The combustion gases are channeled from combustor 16 to drive turbines 18 and 20.

In the exemplary embodiment, engine 10 is operable to power an aircraft during various modes of operation including idle, take-off, cruise, and descent. Engine 10, therefore, operates under transient conditions upon acceleration or deceleration of first and second rotor shafts 24 and 26 as engine 10 is either increased in power, powered up, or decreased in power, powered down, during operations. Engine 10 also operates at steady state conditions, such as, for example, during cruise operations wherein the power of engine 10 is substantially maintained at an intermediate fixed amount and the speeds of first and second rotor shafts 24 and 26 are held relatively constant.

Figure 2:
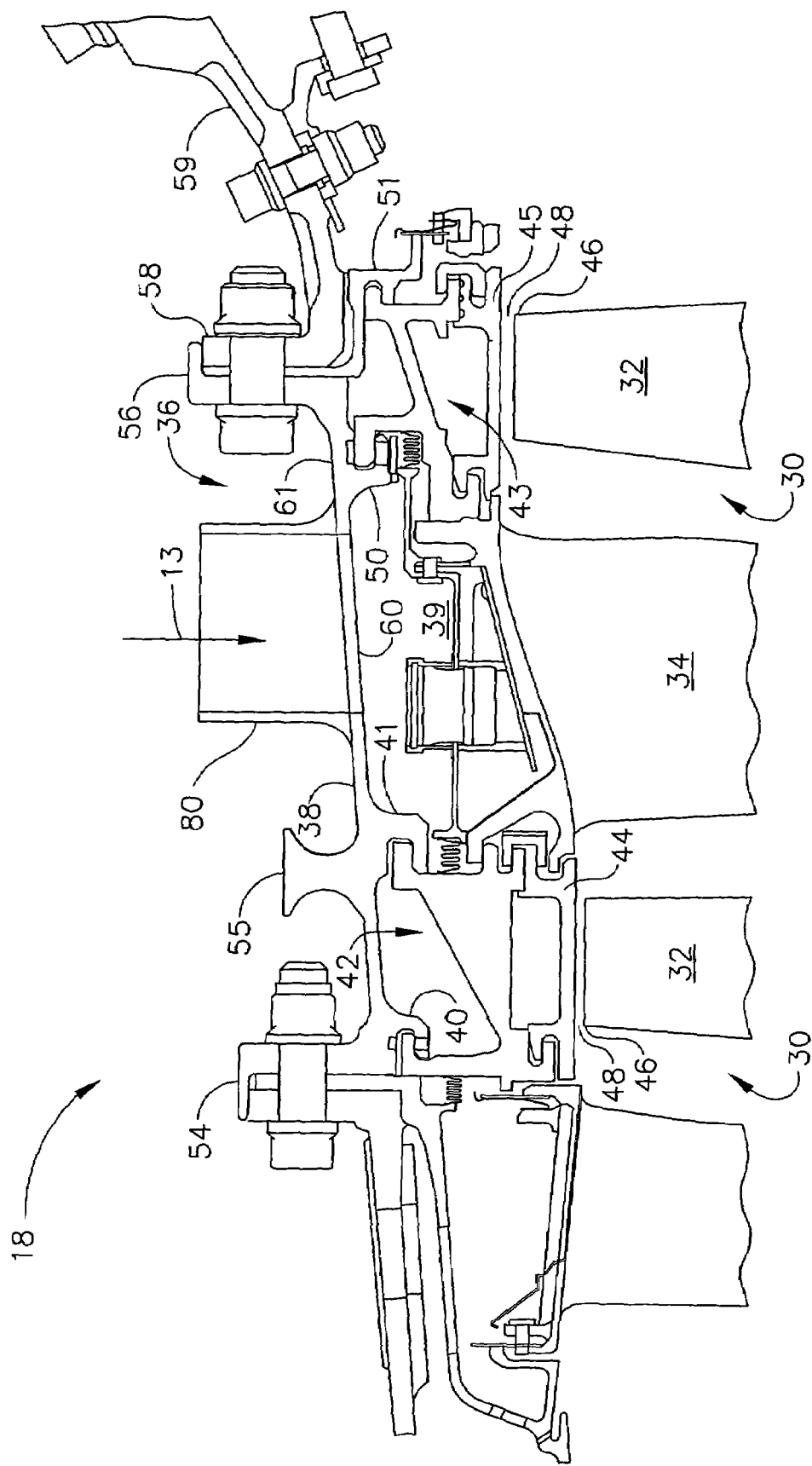
FIG. 2 is a schematic illustration of a portion of a high pressure turbine shown in FIG. 1.
Figure 3:
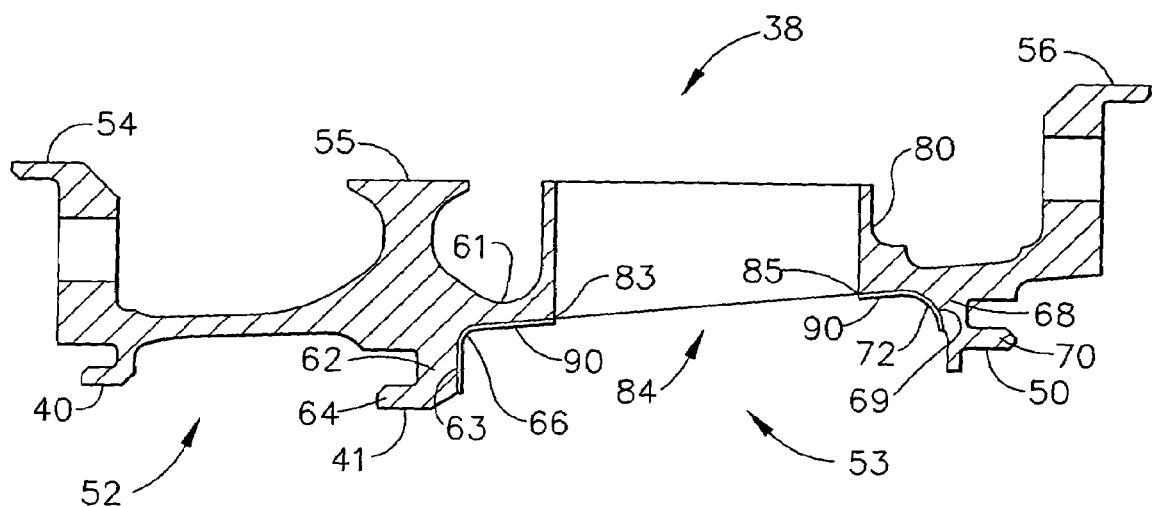
FIG. 3 is an enlarged cross sectional view of a portion of the high pressure turbine shown in FIG. 2.
Figure 4:
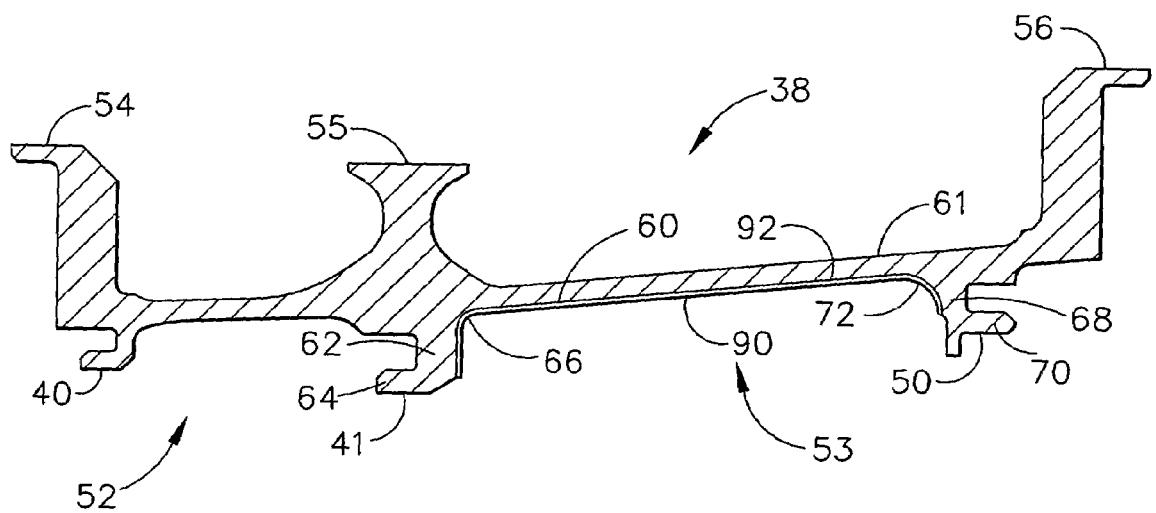
FIG. 4 is an enlarged cross sectional view of a portion of the high pressure turbine shown in FIG. 2.

FIG. 2 is a schematic illustration of a portion of high pressure turbine 18. FIG. 3 is an enlarged cross sectional view of a portion of HPT 18. FIG. 4 is an enlarged cross sectional view of a portion of HPT 18 taken circumferentially adjacent to the portion in FIG. 3. HPT 18 includes a plurality of stages 30, each of which includes a row of turbine blades 32 and a row of stator vanes 34. Turbine blades 32 are supported by rotor disks (not shown), that are coupled to rotor shaft 26. An HPT casing 36 extends circumferentially around turbine blades 32 and stator vanes 34, such that vanes 34 are supported by casing 36.

HPT casing 36 includes a base case segment 38 that is spaced from stator vanes 34 such that a plenum 39 is defined therebetween. Case segment 38 includes a forward mounting hook 40 and an intermediate mounting hook 41. Mounting hooks 40 and 41 define a forward shroud channel 52. A forward shroud assembly 42 in forward shroud channel 52 is coupled to mounting hooks 40 and 41. Case segment 38 also includes an aft mounting hook 50 that is coupled to an adjacent downstream shroud assembly 43. Mounting hooks 41 and 50 define an aft shroud channel 53 in case segment 38, as described in more detail below. Each shroud assembly 42 and 43 includes a respective shroud 44 and 45 that is mounted radially outward of turbine blade tips 46 such that an axisymmetric tip clearance 48 is defined between shrouds 44 and 45 and turbine blade tips 46.

Case segment 38 includes a forward mounting flange 54, an intermediate flange 55, and an aft mounting flange 56 used for coupling case segment 38 substantially axially within engine 10. Forward mounting hook 40 extends radially inward from forward mounting flange 54, intermediate mounting hook 41 extends radially inward from intermediate flange 55, and aft mounting hook 50 extends radially inward of aft mounting flange 56. An additional mounting hook 51 is coupled between case segment mounting flange 56 and a mounting flange 58 extending from an adjacent case segment 59. Thus, shroud assembly mounting hooks 50 and 51 are each positioned at case segment mounting flanges, specifically, mounting flange 56 and mounting flange 58.

Case segment 38 also includes an outer surface 61 that extends between intermediate flange 55 and mounting flange 56. In one embodiment, engine 10 includes a clearance control system (not shown) that is coupled in flow communication with case segment 38 to facilitate cooling outer surface 61 via a plurality of ducts (not shown).

Aft shroud channel 53 extends between intermediate mounting hook 41 and aft mounting hook 50 and is further defined by case segment radially inner surface 60. Mounting hook 41 includes a base portion 62 that extends radially inward from case segment 38, and a lip portion 64 that extends upstream from base portion 62. Base portion 62 includes an aft surface 63 that extends to lip portion 64. Base portion 62 is coupled to inner surface 60 such that an accurate aftward facing joint 66 is defined.

Mounting hook 50 includes a base portion 68 that extends radially inward from case segment 38 and a lip portion 70 that extends aftward from base portion 68. Base portion 68 includes a forward surface 69 extends to lip portion 70. Base portion 68 is coupled to inner surface 60 such that an accurate forward facing joint 72 is defined. Inner surface 60 extends between joints 66 and 72.

HPT 18 also includes a plurality of circumferentially-spaced air inlet tubes 80 that are coupled in flow communication with HPT casing 36. Inlet tubes 80 are coupled to HPT casing 36 between mounting hooks 41 and 50, and at case segment 38. An opening 84 extends through case segment 38 and inner surface 60 to enable plenum 39 to receive compressed air 13 discharged from inlet tubes 80 through opening 84.

During operation of engine 10, compressed air 13, which may include hot engine gases including compressor discharge parasitics and leakages, is channeled through inlet tubes 80 into plenum 39 and generates temperature gradients in HPT casing 36 such that the temperature gradients generate both radial axisymmetric growth and a circumferential distortion during both steady state takeoff and cruise operations, and inasmuch as HPT casing 36 supports shroud assembly 42 at intermediate mounting hook 41 and shroud assembly 43 at aft mounting hook 50, running tip clearance 48 may be increased. An increase in running tip clearance 48 facilitates reducing HPT 18 efficiency. Controlling axisymmetric running tip clearances 48 facilitates reducing peak exhaust gas temperatures (EGT) during take-off operations, thereby facilitating limiting EGT overshoot. Additionally, maintaining tight running tip clearances 48 during cruise operations facilitates reducing specific fuel consumption (SPC).

As shown more clearly in FIGS. 3 and 4, a thermal barrier coating (TBC) 90 is applied to aft shroud channel 53. In the exemplary embodiment, TBC 90 extends from intermediate mounting hook base portion aft surface 63 along case segment inner surface 60 to aft mounting hook base portion forward surface 69. In another exemplary embodiment, TBC 90 extends from intermediate mounting hook base portion aft surface 63 along case segment inner surface 60 to an inlet tube forward edge 83 and from an inlet tube aft edge 85 to aft mounting hook base portion forward surface 69.

In one embodiment, TBC 90 is a nickel chromium aluminum (NiCrAl) coating having a nominal composition range, in weight percent, of from approximately 4.5% to approximately 7.5% percent aluminum, from approximately 15.5% to approximately 20.5% chromium, approximately 3.0% manganese, approximately 1.0% iron, approximately 0.3% carbon, approximately 2.0% silicon, approximately 3.5% of other elements, and approximately 70.0% nickel. The NiCrAl coating is presented by way of example, and not by way of limitation. In one embodiment, coating 90 is between approximately 0.035 inches and approximately 0.045 inches in thickness and may be applied to aft shroud channel 53 using any known thermal spray technique including, but not limited to, high velocity oxyfuel spray (HVOF), air plasma spray (APS), low-pressure-plasma spray (LPPS), electric wire arc spray, and combustion wire or powder spray. In another embodiment, a bond coating 92 is applied to aft shroud channel 53 prior to TBC 90 such that, coating 92 has a thickness between approximately 0.004 inches and approximately 0.01 inches.

During operation, turbine performance maybe influenced by running tip clearance 48, and as such, it is desired to optimize running tip clearance 48 while preventing blade tips 46 from contacting shrouds 44 and 45. To facilitate maintaining running tip clearance 48, it is desired to substantially match the thermal growth of the turbine casing 36, including case segment 38, to that of the rotor disks (not shown) and turbine blades 32. Because TBC 90 is applied to base case segment 38, thermal growth characteristics of case segment 38 at mounting hooks 41 for shroud assemblies 42 and 43 can be more closely matched with thermal growth characteristics of forward and rearward case mounting flanges 54 and 56, respectively. As such, axisymmetric turbine blade tip to shroud running tip clearance 48 is facilitated to be controlled during take-off operations and maintained during cruise operations. More specifically, EGT overshoot and SFC are facilitated to be reduced beyond pre-determined limits by adding TBC 90 to the inner surface 60 of case segment 38.

The above-described TBC provides a cost-effective coating that can be used to facilitate controlling axisymmetric running clearance and to facilitate thermal growth characteristics being matched in a case segment such that turbine blade tip to shroud running clearances may be maintained while reducing EGT overshoots. Maintaining tight axisymmetric running tip clearances reduces peak EGT during Take-off and cruise operations, thereby increasing time on wing of fielded engines and increase new and refurbished engine shop readiness.

Exemplary embodiments of turbine casing assemblies, specifically casing segments are described above in detail. Each casing segment is not limited to the specific embodiments described herein, but rather each component may be utilized independently and separately from other components described herein. Each component can also be used in combination with other turbine casing assemblies.

While the invention has been described in terms of various specific embodiments, those skilled in the art will recognize that the invention can be practiced with modification within the spirit and scope of the claims.

What is claimed is:

1. A method for assembling a rotor assembly for a gas turbine engine, the rotor assembly including a plurality of rotor blades and at least one turbine shroud assembly, said method comprises:
   mounting a plurality of case segments together to form a casing around the plurality of rotor blades and the at least one turbine shroud assembly, wherein each of the case segments includes at least two mounting hooks extending radially inwardly from the case segment and a channel extending between the at least two mounting hooks; and
   applying a thermal barrier coating to an inner surface of the channel and at least a portion of each mounting hook to facilitate maintaining an axisymmetric running tip clearance defined between the plurality of rotor blades and the at least one turbine shroud assembly during engine operations such that an exhaust gas temperature overshoot and a specific fuel consumption is reduced.

2. A method in accordance with claim 1 wherein mounting a plurality of case segments together further comprises mounting a plurality of case segments together, wherein each case segment includes at least two mounting hooks that each have a base portion, a lip portion, and a channel portion, wherein at least a portion of each channel portion has the thermal baffler coating such that during engine operations the case segments facilitate reducing the exhaust gas temperature overshoot of the gas turbine engine.

3. A method in accordance with claim 1 further comprising coupling at least one inlet tube to the case segment such that the at least one inlet tube is coupled in flow communication with the channel defined within the respective case segment, and wherein the at least one inlet tube includes an aft edge and a forward edge, wherein at least a portion of each aft and forward edge has the thermal barrier coating.

4. A method in accordance with claim 1 wherein applying a thermal barrier coating to an inner surface of the channel further comprises applying the thermal baffler coating to the channel to facilitate substantially matching a thermal rate of expansion of each plurality of case segments to a rate of thermal expansion of the at least one turbine shroud assembly such that the axisymmetric running tip clearance is maintained during engine operations.

5. A method in accordance with claim 1 wherein applying a thermal baffler coating comprises applying the thermal barrier coating with a thickness greater than 0.035 inches.

6. A method in accordance with claim 1 wherein applying a thermal barrier coating comprises applying the thermal baffler coating with a thickness less than 0.045 inches.

7. A rotor assembly for a gas turbine engine, said assembly comprising:
   at least one case segment comprising an intermediate flange, an aft flange, and a body extending therebetween, said body comprising at least two mounting hooks extending radially inwardly from said body and at least one channel defined between said at least two mounting hooks;
   a plurality of rotor blades;
   at least one turbine shroud assembly coupled radially outward of said plurality of rotor blades such that an axisymmetric running tip clearance is defined between said plurality of rotor blades and said at least one turbine shroud assembly; and
   a thermal barrier coating applied to said at least one channel, said coating is configured to facilitate maintaining said axisymmetric running tip clearance during engine operations such that an exhaust gas temperature overshoot and a specific fuel consumption is reduced.

8. A rotor assembly in accordance with claim 7 wherein said at least two mounting hooks each comprise a base portion, a lip portion, and a channel portion, said thermal barrier coating is applied to at least a portion of each said channel portion.

9. A rotor assembly in accordance with claim 7 further comprising providing an inlet tube comprising an aft edge and a forward edge, wherein said tube is in flow communication with said at least one case segment channel, and wherein at least a portion of each said aft and forward edges has said thermal barrier coating.

10. A rotor assembly in accordance with claim 7 wherein said thermal barrier coating is coupled to said at least one channel and is configured to facilitate the thermal expansion of said at least one case segment at a rate that is substantially identical to a rate of thermal expansion of said at least one turbine shroud assembly such that said axisymmetric running tip clearance is maintained during engine take-off and cruise operations.

11. A rotor assembly in accordance with claim 7 wherein said thermal barrier coating comprises a thickness greater than 0.035 inches.

12. A rotor assembly in accordance with claim 7 wherein said thermal barrier coating comprises a thickness less than 0.045 inches.

13. A gas turbine engine comprising:
   a rotor assembly including at least one case segment comprising an intermediate flange, an aft flange, and a body extending therebetween, said body comprising at least two mounting hooks extending radially inwardly from the body and at least one channel defined between said at least two mounting hooks;

a plurality of rotor blades;

at least one turbine shroud assembly coupled radially outward of said plurality of rotor blades such that an axisymmetric running tip clearance is defined between said plurality of rotor blades and said at least one turbine shroud assembly; and a thermal barrier coating applied to said at least one channel, said coating is configured to facilitate maintaining said axisymmetric running tip clearance during engine take-off and cruise operations.

14. An engine in accordance with claim 13 wherein said at least two mounting hooks each comprise a base portion, a lip portion, and a channel portion, such that during engine operations the at least one case segment facilitates reducing an exhaust gas temperature overshoot of the gas turbine engine.

15. An engine in accordance with claim 13 further comprising at least one inlet tube coupled to the at least one case segment such that the at least one inlet tube is coupled in flow communication with the at least one channel defined within the respective case segment, and wherein the at least one inlet tube includes an aft edge and a forward edge, wherein at least a portion of each aft and forward edge has the thermal barrier coating.

16. An engine in accordance with claim 13 wherein said thermal barrier coating is coupled to the at least one channel to facilitate substantially matching a thermal rate of expansion of each of the at least one case segments to a rate of thermal expansion of the at least one turbine shroud assembly during engine take-off and cruise operations.

17. An engine in accordance with claim 13 wherein said thermal barrier coating comprises a thickness greater than 0.035 inches.

18. An engine in accordance with claim 13 wherein said thermal barrier coating comprises a thickness less than 0.045 inches.

* * * * *

UNITED STATES PATENT AND TRADEMARK OFFICE
CERTIFICATE OF CORRECTION

PATENT NO. : 7,246,996 B2  Page 1 of 1
APPLICATION NO. : 11/028815
DATED : July 24, 2007
INVENTOR(S) : Harris It is certified that error appears in the above-identified patent and that said Letters Patent is hereby corrected as shown below:

In Claim 2, column 5, line 60, delete "baffler" and insert therefor -- barrier --.
In Claim 4, column 6, line 5, delete "baffler" and insert therefor -- barrier --.
In Claim 5, column 6, line 12, delete "baffler" and insert therefor -- barrier --.
In Claim 6, column 6, line 16, delete "baffler" and insert therefor -- barrier --.

Signed and Sealed this

Twentieth Day of November, 2007

JON W. DUDAS
*Director of the United States Patent and Trademark Office*